United States Patent [19]

Yamazawa et al.

[11] Patent Number: 4,821,598
[45] Date of Patent: Apr. 18, 1989

[54] STEERING WHEEL CORE MATERIAL

[75] Inventors: Yasushi Yamazawa; Katsumi Kondo, Both of Shizuoka; Yasuhiro Tsuchiya, Aichi; Shinji Koike; Masaki Terada, Both of Shizuoka, all of Japan

[73] Assignee: Toyota Jidosha Kabushiki Kaisha, Japan

[21] Appl. No.: 116,245

[22] Filed: Nov. 3, 1987

[30] Foreign Application Priority Data

Nov. 5, 1986 [JP] Japan ............................. 61-263074
Apr. 13, 1987 [JP] Japan ............................. 62-90176
May 26, 1987 [JP] Japan ............................. 62-79703

[51] Int. Cl.⁴ .................... B62D 1/04; D06C 11/00; B32B 5/12
[52] U.S. Cl. ................................... 74/552; 428/65; 428/113; 428/178; 428/188; 428/319.9; 29/159 B
[58] Field of Search ............... 428/137, 251, 415, 65, 428/113, 178, 188, 319.9; 156/166, 172, 194, 186; 74/552; 264/271.1; 29/159 B

[56] References Cited

U.S. PATENT DOCUMENTS

| | | | |
|---|---|---|---|
| 4,407,772 | 10/1983 | Maglio | 156/194 |
| 4,627,307 | 12/1986 | Yamazawa | 74/552 |
| 4,633,734 | 1/1987 | Yano et al. | 74/552 |
| 4,635,500 | 1/1987 | Orercauhier et al. | 74/552 |
| 4,673,451 | 6/1987 | Yamazawa et al. | 156/172 |
| 4,681,647 | 7/1987 | Kondo et al. | 156/172 |
| 4,705,716 | 11/1987 | Tang | 428/415 |
| 4,741,223 | 5/1988 | Kondo et al. | 74/552 |
| 4,749,422 | 6/1988 | Kondo et al. | 156/166 |
| 4,759,231 | 7/1988 | Kurata et al. | 74/552 |

Primary Examiner—Ellis P. Robinson
Assistant Examiner—P. J. Ryan
Attorney, Agent, or Firm—Finnegan, Henderson, Farabow, Garrett & Dunner

[57] ABSTRACT

A steering wheel core material of continuous filament FRP for vehicles which is made up of a ring, a boss positioned at the center of the ring, and spokes connecting the boss to the ring, said boss being integrally joined to a boss metal fitting. It is formed by winding resin-impregnated continous filaments in layer around the ring- and spoke-forming mold and the body of the boss metal fitting, with an elastic material interposed between the body of the boss metal fitting and the FRP.

8 Claims, 8 Drawing Sheets

STEERING WHEEL CORE MATERIAL

BACKGROUND OF THE INVENTION

1. Field of the Invention

The present invention relates to a steering wheel core material which is produced from FRP (fiber reinforced plastics).

2. Description of the Prior Art

For the purpose of weight reduction and strengthening, a new type of automobile steering wheel has recently been developed. It is made up of a core reinforced with continuous filament rovings, a cushioning material covering the core, and a surface layer of leather or the like. It is now in practical use.

The core is made of continuous filaments such as glass fiber and carbon fiber impregnated with epoxy resin, polyester resin, or the like. To make the core, the resin-impregnated continuous filaments are wound in layer around a jig and the resin is cured by heating. This FRP core is light in weight and very strong. It is used to produce a steering wheel which is very little subject to the vibrations of the automobile during driving.

This type of steering wheel core has a structure as shown in FIG. 25. The steering wheel core 1 of FRP is made up of a ring 2, a boss 3 positioned at the center of the ring 2, and spokes 4 which connect the ring 2 to the boss 3. The boss 3 is provided with a metal fitting 9 to which the steering shaft is connected. The metal fitting is integrally joined to the FRP core when the continuous filaments are laminated.

The steering wheel core 1 is produced by using an apparatus shown in FIGS. 26 and 27. The apparatus 5 is made up of a main shaft 6, a lower mold 7 fixed to the shaft 6, and an upper mold 8 which mates with the lower mold 7. The upper and lower molds 7 and 8 have grooves 7a and 8a, respectively, formed on their circumference. When the upper and lower molds 7 and 8 are closed, these grooves 7a and 8a form a groove having a semicircular cross-section in which the ring 2 is made. The core 1 is produced in the following manner. At first, a boss metal fitting 9 is attached to the shaft 6, and the upper mold 8 is mated to the lower mold 7. Resin-impregnated continuous filaments are wound around the groove by turning the shaft 6 so that the ring 2 is formed, and they are bent at the notches 8b formed on the circumference of the upper mold 8 and led to the boss metal fitting 9 and wound around its body 9a so that the boss 3 and spokes 4 are formed. After winding, the assembly is heated to cure the resin. Thus there is obtained the steering wheel core 1 of continuous filament roving FRP.

A disadvantage of the steering wheel core 1 produced as mentioned above is that it has such a light weight and a small inertia moment that it is poor in performance to prevent the steering wheel from vibrating in the circumferential direction (flutter characteristics).

One way to improve the flutter characteristics is to increase the weight of the ring 2 by attaching weights to the ring 2 or by increasing the amount of continuous filaments wound in the ring 2. However, attaching weights leads to low productivity and high production cost because it takes more time and labor to place weights at accurate positions on the apparatus 5 for the well-balanced steering wheel. On the other hand, increasing the amount of continuous filaments results in an extremely thick ring 2 because they have a low specific gravity. A steering wheel with a thick ring is awkward to handle. Unfortunately, improving the flutter characteristics by increasing the weight of the ring aggravates the shake characteristics because it increases the total weight of the steering wheel.

SUMMARY OF THE INVENTION

The present invention was completed to eliminate the above-mentioned disadvantages involved in the conventional steering wheel core material. It is an object of the present invention to provide an FRP steering wheel core material which is improved in flutter characteristics without the addition of weight to the ring which adversely affects the shake characteristics.

The gist of the present invention resides in a laminated FRP steering sheel core material formed by winding resin-impregnated continuous filaments in layer around the ring- and spoke-forming mold and the body of the boss metal fitting positioned at the center of the ring, characterized in that an elastic material is interposed between the body of the boss metal fitting and the resin-impregnated continuous filaments wound around the body of the boss metal fitting. Since the interposed elastic material absorbs vibrations, the steering wheel has improved flutter characteristics even though the ring is not made heavier.

The elastic material, boss metal fitting, and resin-impregnated continuous filaments are integrally joined together in the production of the steering wheel core material. The process comprises attaching the elastic material to the boss metal fitting, mounting the boss metal fitting on the molding apparatus, and winding the resin-impregnated continuous filaments. Thus the process is simple and can be run efficiently at low cost.

The elastic material is not specifically limited; it includes, for example, rubber, synthetic resin, air, and oil.

According to the present invention, it is possible to easily improve the flutter characteristics, while keeping good shake characteristics, simply by interposing an elastic material between the FRP and the boss metal fitting.

BRIEF DESCRIPTION OF THE DRAWINGS

FIG. 6 is compared with that of a conventional FRP-cored steering wheel and an iron-cored steering wheel.

DETAILED DESCRIPTION OF THE INVENTION

The examples in the invention will be explained with reference to the drawings.

Figure 1:
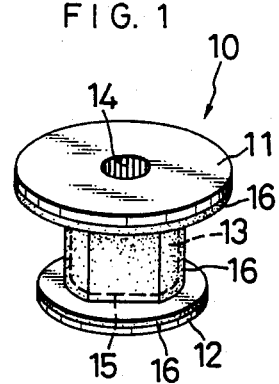
FIG. 1 is a perspective view of the boss metal fitting used for the steering wheel core material in the first example of the invention.
Figure 2:
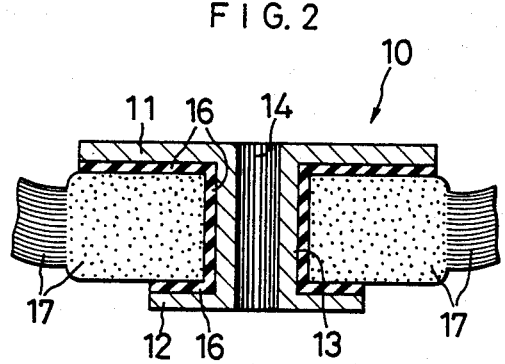
FIG. 2 is a longitudinal sectional view of the boss metal fitting as shown in FIG. 1.

Refer to FIGS. 1 and 2 for the first example. In the first example, the steering wheel core material is provided with a boss metal fitting 10 as shown in FIG. 1. It is made up of upper and lower flanges 11 and 12 and a body 13. The body has a serrated through hole 14 into which the steering shaft (now shown) is fitted. A pair of flat surfaces 15 are formed parallel to each other on the periphery of the body 13. An elastic material 16 of rubber or synthetic material, 0.1 to 3 mm thick, is joined to the periphery of the body 13 and the inside of the flanges 11 and 12.

The thus constructed boss metal fitting 10 is mounted on the above-mentioned apparatus 5. Using the apparatus 5, resin-impregnated continuous filaments are wound around the mold and the resin is cured by heating. In this way, the steering wheel core material 1 is formed.

Figure 4:
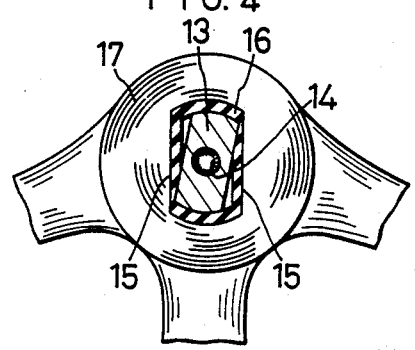
Figure 5:
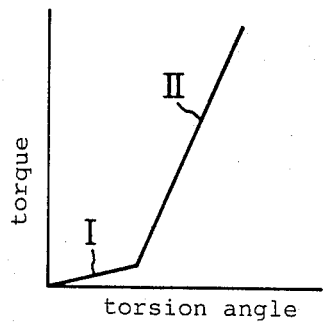
FIG. 5 is a graph showing the relation between the torque and torsion angle observed in the operation of a steering wheel produced from the steering wheel core material in the first example.

The steering wheel core material 1 is used to produce a steering wheel, which has the characteristic properties as explained in the following with reference to FIGS. 3 to 5.

Figure 3:
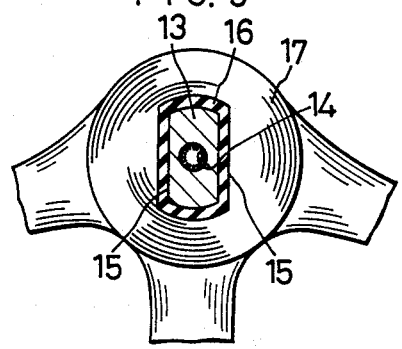
FIGS. 3 and 4 are transverse sectional views showing the steering wheel core material and the elastic material in the first example.

The elastic material 16 remains almost undeformed when a low-torque force is applied to the steering wheel, as shown in FIG. 3. In this state, the elastic material absorbs the vibrations that occur in the circumferential direction of the steering wheel, thereby improving the flutter characteristics.

As the external force applied to the steering wheel increases, the elastic material 16 deforms to such an extent that the flat surfaces 15 of the boss metal fitting 10 come into direct contact with the FRP 17. Thus the torque applied to the steering wheel is efficiently transmitted to the steering shaft (not shown).

This will be explained with reference to FIG. 5 which shows the relation between the torque and the torsion angle. When a low-torque force is applied to the steering wheel, the torque is transmitted to the steering shaft through the elastic material 16. Thus the torsion angle increases more than the torque increases, as indicated by section I in FIG. 5. When the torque exceeds a certain level, the elastic material 16 becomes deformed to such an extent that the body 13 of the boss metal fitting 10 come into direct contact with the FRP 17. Thus the torque is transmitted directly from the steering wheel to the steering shaft. As the result, the torsion angle increases less than the torque increases, and the torsional rigidity increases. These characteristic properties can be established as desired by properly selecting the quality and thickness of the elastic material 16, the position where the elastic material 16 is bonded, and the shape of the body.

Figure 6:
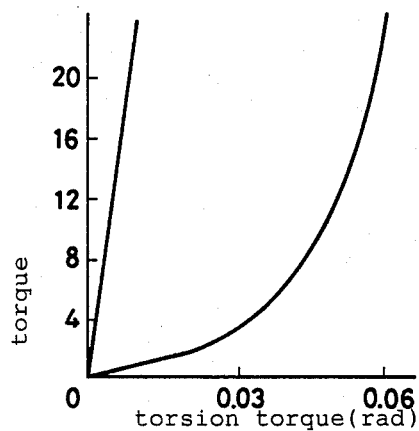
FIG. 6 is a graph showing the relation between the torque and torsion angle experimentally obtained with a steering wheel produced from the steering wheel core material in the first example, in which the elastic material has a torsional rigidity of 65 N.m/rad.

The relation between torque and torsion angle was experimentally examined using a steering wheel whose torsional rigidity is adjusted to 65 N.m/rad with the elastic material 16. The results are shown in FIG. 6. This steering wheel is designed such that the body 13 of the boss metal fitting 10 comes into direct contact with the FRP 17 when it is turned 0.03 rad. The straight line in FIG. 6 denotes the characteristics of a conventional steering wheel.

It is noted from FIG. 6 that the steering wheel has a low torsional rigidity on account of the deformation of the elastic material 16 until it is turned 0.03 rad, but beyond that angle, it has as high a torsional rigidity as the conventional one because the boss metal fitting comes into direct contact with the FRP 17.

Figure 7:
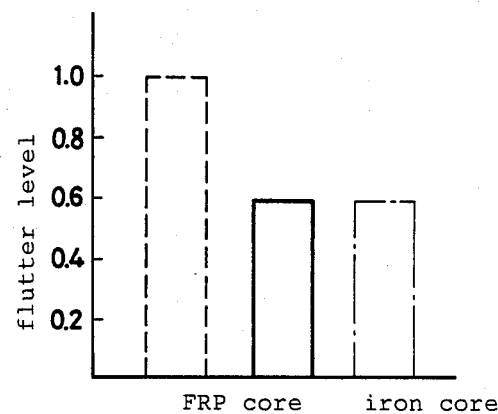
FIG. 7 is a graph in which the flutter level of the steering wheel used in the experiment to give

This steering wheel has the flutter characteristics (vibrations in the circumferential direction) which are numerically expressed in terms of flutter level (acceleration in the circumferential direction of the ring of the steering wheel) in FIG. 7 (solid line). It is noted that it has a flutter level of 0.6G, whereas the conventional one (indicated by a broken line) has a flutter level of 1.0G. This low flutter level is almost equal to that of the iron-cored steering wheel (indicated by a chain line) which is 1.7 times heavier and has a 1.6 times greater inertia moment.

Figure 8:
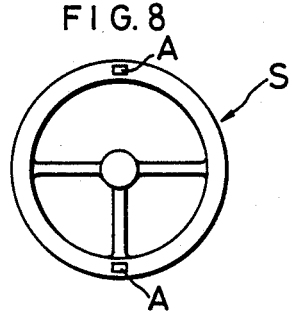
FIG. 8 is a front view showing the steering wheel with an accelerometer attached to measure the flutter level.
Figure 9:
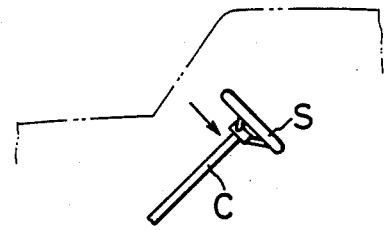
FIG. 9 is a diagram indicating the position where vibration is applied to examine the frequency characteristics of the steering wheel used for the experiment in FIG. 6.

Incidentally, the flutter level was obtained by measuring the acceleration applied in the circumferential direction of the steering wheel (S) when a car with an unbalanced tire is run. (The amount of unbalance is 4 g, and the accelerometers (A) are attached to the steering wheel (S) as shown in FIG. 8.) The smaller the flutter level, the better the maneuverability.

Figure 10:
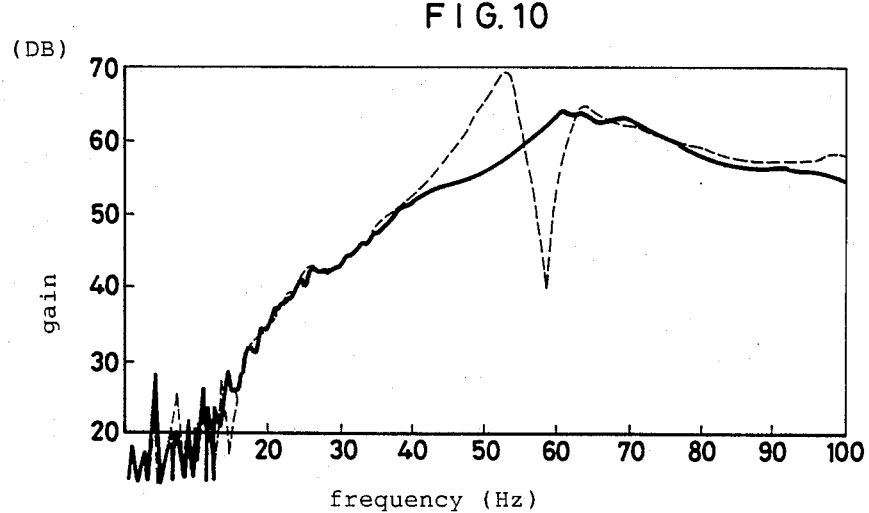
FIG. 10 is a diagram showing the frequency characteristics of the steering wheel made from the steering wheel core material in the first example and the conventional steering wheel. The measurements were carried out by applying vibrations to the position indicated in FIG. 9.

It has been experimentally confirmed that the flutter level is remarkably decreased in the case where the steering wheel has an elastic material which provides a torsional rigidity of 30 to 300 N.m/rad The above-mentioned steering wheel, with the elastic material 16 interposed between the boss metal fitting 10 and the FRP 17, has the frequency characteristics as shown in FIG. 10 (solid line). For comparison, those of a conventional steering wheel are also shown in FIG. 10 (broken line). The measurements were carried out by applying vibrations in the direction of the arrow to the steering shaft (C) of the steering wheel (S) mounted on the car body (B).

It is noted from FIG. 10 that the frequency characteristics of the steering wheel pertaining to the present invention has a lower gain and a higher peak frequency than the conventional steering wheel. This is attributable to the damping effect of the elastic material. Thus it is found that the steering wheel core material of the present invention favorably affects the shake characteristics (vibrations of the steering wheel in the vertical direction).

Figure 11:
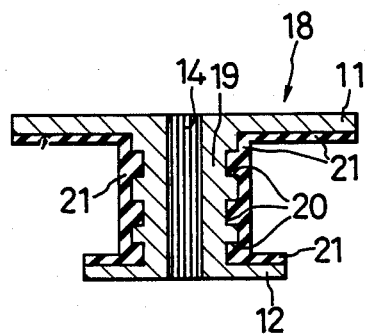
FIG. 11 is a longitudinal sectional view of the boss metal fitting used in the steering wheel core material in the second example of the invention.
Figure 12:
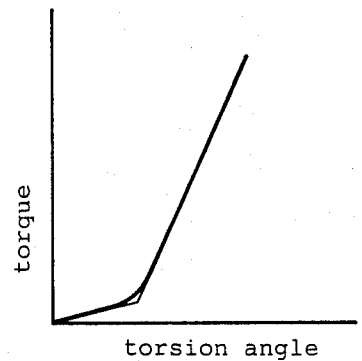
FIG. 12 is a graph showing the relation between the torque and torsion angle observed in the operation of a steering wheel in which is used the boss metal fitting as shown in FIG. 11.

The boss metal fitting in the second example is explained with reference to FIG. 11. The boss metal fitting 18 has a plurality of grooves 20 formed on the periphery of the body 19. The elastic material 21 is fitted into the grooves 20. An advantage of this structure is that the thickness of the elastic material is not even and the boss metal fitting 18 comes into contact with the FRP 17 in two stages. As the result, the torsional angle changes smooth as shown in FIG. 12. This permits the driver to operate the steering wheel with a natural feeling.

Figure 13:
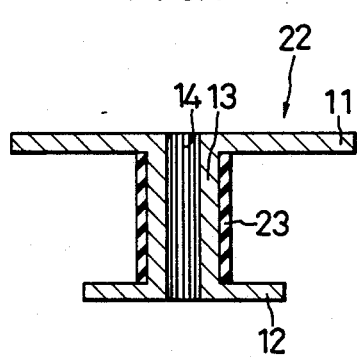
FIG. 13 is a longitudinal sectional view of the boss metal fitting used in the steering wheel core material in the third example of the invention.

The boss metal fitting in the third example is shown in FIG. 13. In this case, the elastic material 23, 0.1 to 3 mm thick, is bonded to only the body 13 of the boss metal fitting 22; but it is not bonded to the inside of the flanges 11 and 12.

Figure 14:
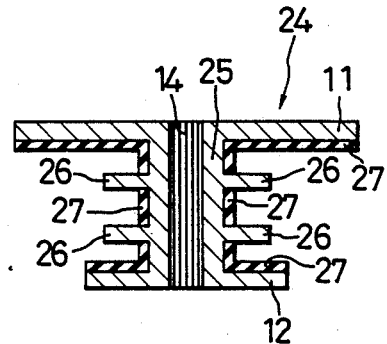
FIG. 14 is a longitudinal sectional view of the boss metal fitting used in the steering wheel core material in the fourth example of the invention.

The boss metal fitting in the fourth example is shown in FIG. 14. In this case, the body 25 of the boss metal fitting 24 is provided with a plurality of pins 26 and the elastic material 27, 0.1 to 3 mm thick, is bonded to that part of the body where there are no pins 26.

In the case of a steering wheel provided with the boss metal fitting 22 as shown in FIG. 13, the insides of the flanges 11 and 12 are in direct contact with the FRP 17. In the case of a steering wheel provided with the boss metal fitting 24 as shown in FIG. 14, the pins 26 are in direct contact with the FRP 17. The joint part transmits torque to the steering shaft and the elastic material 23 or 27 absorbs vibrations. Therefore, the steering wheel permits sharp steering operation and provides improved flutter characteristics.

Figure 15:
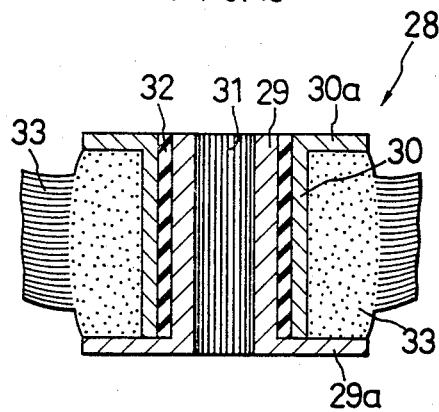
FIG. 15 is a longitudinal sectional view of the boss metal fitting used in the steering wheel core material in the fifth example of the invention.
Figure 16:
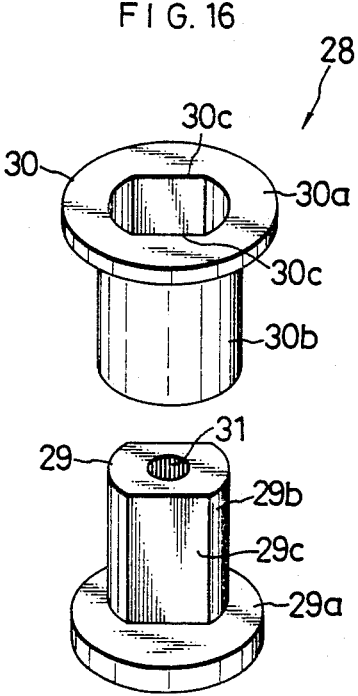
FIG. 16 is a disassembly perspective view of the boss metal fitting as shown in FIG. 15.

The fifth example is explained with reference to FIGS. 15 to 19. The steering wheel core material in this example has the boss metal fitting 28 as shown in FIGS. 15 and 16. It is made up of the inner member 29 and the cylindrical outer member 30.

The inner member 29 has a flange 29a at its lower end and also has at its center a serrated through hole 31 into which the steering shaft (not shown) is fitted. In addition, on the periphery of the body 29b are formed a pair of parallel flat surfaces 29c. On the other hand, the cylindrical outer member 30 has a flange 30a at its upper part. On the internal periphery of the body 30b are formed a pair of parallel flat surfaces 30c. The inner member loosely fits into the outer member so that the body 29b of the inner member 29 turns to come into contact with the flat surface 30c of the outer member 30.

When the inner member 29 is fitted into the outer member 30, a gap is formed between them. This gap is filled with an elastic material 32 such as rubber, synthetic resin, air, and oil to complete the boss metal fitting 28. Three kinds of elastic materials each having a torsional rigidity of 75 (sample 1), 100 (sample 2), and 250 (sample 3) N.m/rad were selected to produce three kinds of boss metal fittings.

The boss metal fitting 28 was mounted on the above-mentioned manufacturing apparatus 5, and the steering wheel core as shown in FIG. 15 was formed by winding the continuous filaments RFP 33. The steering wheel core was fabricated into a steering wheel. The thus produced steering wheel was examined for flutter level.

The flutter level was obtained by measuring the acceleration applied in the circumferential direction of the steering wheel (S) when a car with an unbalanced tire is run. The amount of unbalance is 40 g. The peak acceleration is regarded as the flutter level of the steering wheel. The smaller the flutter level, the better the flutter characteristics. The results are shown in the following table. For comparison, the same experiment was carried out with a steering wheel in which the boss metal fitting is filled with an elastic material having a torsional rigidity of 750 N.m/rad (in Comparative Example 1) and a steel-cored steering wheel (in Comparative Example 2).

| Measurements of Flatter Level | |
| --- | --- |
| | Flatter Level (G) |
| Sample 1 | 0.6 |
| Sample 2 | 0.75 |
| Sample 3 | 1.0 |
| Comparative Example 1 | 1.2 |
| Comparative Example 2 | 0.6 |

It is noted from the table above that the steering wheel provided with the boss metal fitting of Sample 1 has almost the same flutter level as the coventional steel-cored steering wheel. It is also noted that Sample 2 and Sample 3 also have good flutter characteristics, although they are not so good as Sample 1.

Figure 17:
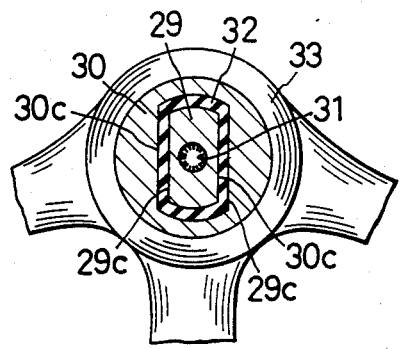
FIGS. 17 and 18 are transverse sectional views showing the steering wheel core material and the elastic material in the fifth example.

The improvement in flutter characteristics achieved in the present invention may be elucidated as follows: While the force applied to the steering wheel has a low torque, the elastic material 32 remains almost undeformed as shown in FIG. 17 and absorbs vibrations in the circumferential direction of the steering wheel. This leads to the improved flutter characteristics.

Figure 18:
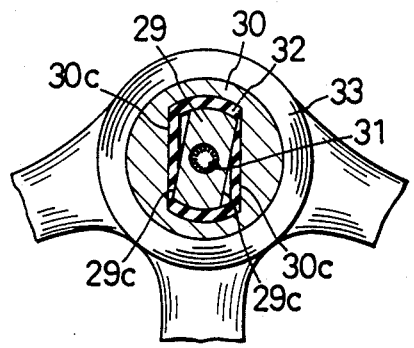

As the torque applied to the steering wheel increases, the elastic material 32 deforms and the edges of the flat surfaces 29c of the inner member 29 come into contact with the flat surface 30c of the outer member 30, as shown in FIG. 18, so that the torque applied to the steering wheel is efficiently transmitted to the steering wheel (not shown).

Figure 19:
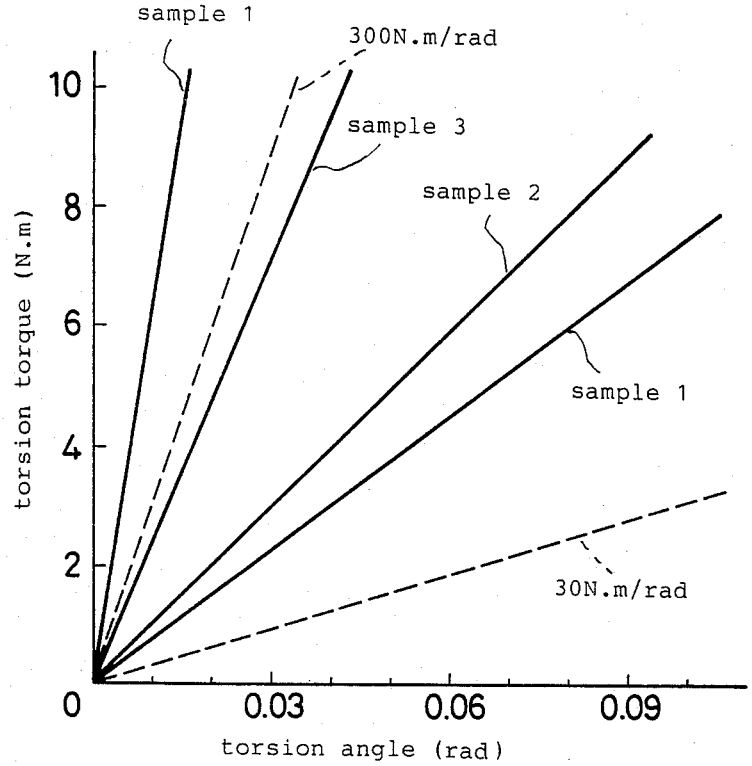
FIG. 19 is a graph showing the relation between the torque and torsion angle observed in the operation of a steering wheel produced from the steering wheel core material in the fifth example.

FIG. 19 shows the relationship between the torque applied to the steering wheel and the torsional angle. While a torque is applied to the steering wheel but the inner member 29 is not yet in contact with the outer member 30, the torque is transmitted to the steering shaft through the elastic material 32. Therefore, in the case of a steering wheel provided with an elastic material having a comparatively small torsional rigidity (samples 1 to 3), the torsional angle increases more than the torque increases. This characteristic can be controlled by changing the gap between the inner member 29 and the outer member 30, or the density and pressure of the elastic material.

Figure 20:
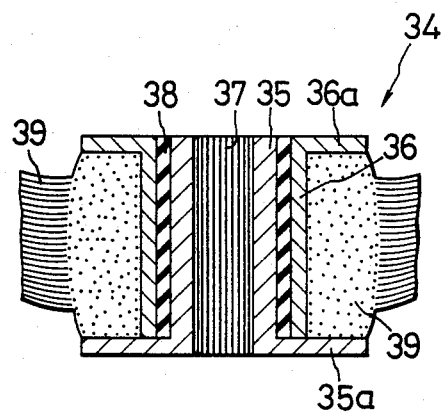
FIG. 20 is a longitudinal sectional view of the boss metal fitting used in the steering wheel core material in the sixth example of the invention.
Figure 21:
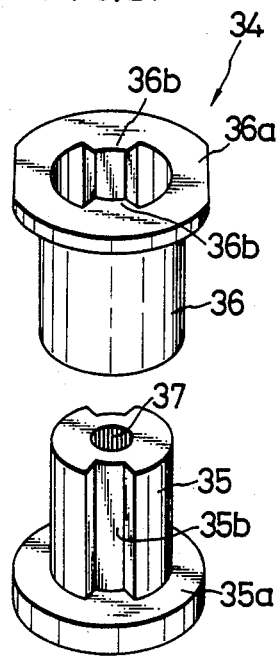
FIG. 21 is a disassembly perspective view of the boss metal fitting as shown in FIG. 20.

The sixth example will be explained with reference to FIGS. 20 to 23. The boss metal fitting 34 is made up of an inner member 35 and a cylindrical outer member 36 as shown in FIG. 20. The inner member 35 has a flange 35a formed at its lower end and also has at its center a serrated through hole 37 into which the steering shaft (not shown) is fitted. In addition, on the periphery of the inner member 35 are formed recessed parts 35b. On the other hand, the cylindrical outer member 36 has a flange 36a formed at its upper end. On the internal periphery of the body 36 are formed projecting parts 36b which loosely fit into the recessed parts 35b, so that they come into contact with each other when the outer member is turned.

When the inner member 35 is fitted into the outer member 36, a gap is formed between them. The gap is filled with an elastic material 38 such as rubber, synthetic resin, air, and oil to complete the boss metal fitting 34. The FRP 39 of continuous filaments is joined to the boss metal fitting 34 to complete the steering wheel core material.

Figure 22:
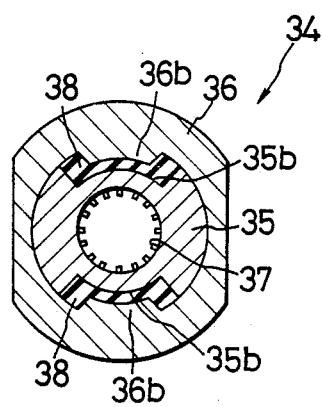
FIG. 22 is a transverse sectional view of the boss metal fitting as shown in FIG. 20.
Figure 23:
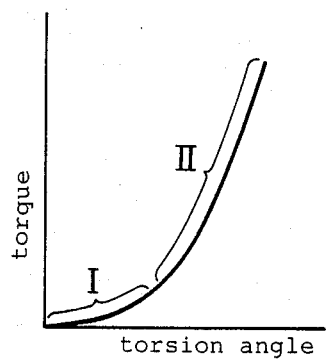
FIG. 23 is a graph showing the relation between the torque and torsion angle observed in the operation of a steering wheel produced from the steering wheel core material in the sixth example.
Figure 24:
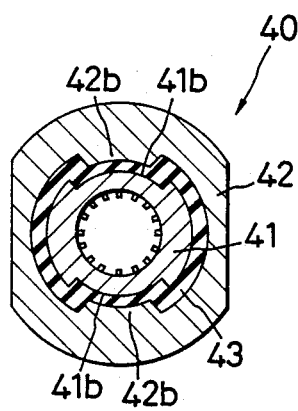
FIG. 24 is a transverse sectional view of the boss metal fitting used in the steering wheel core material in the seventh example of the invention.
Figure 25:
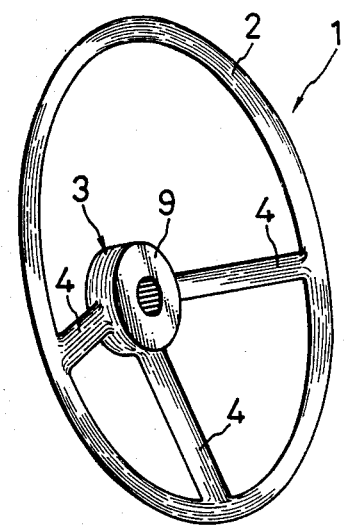
FIG. 25 is a perspective view showing an example of FRP steering wheel core material.
Figure 26:
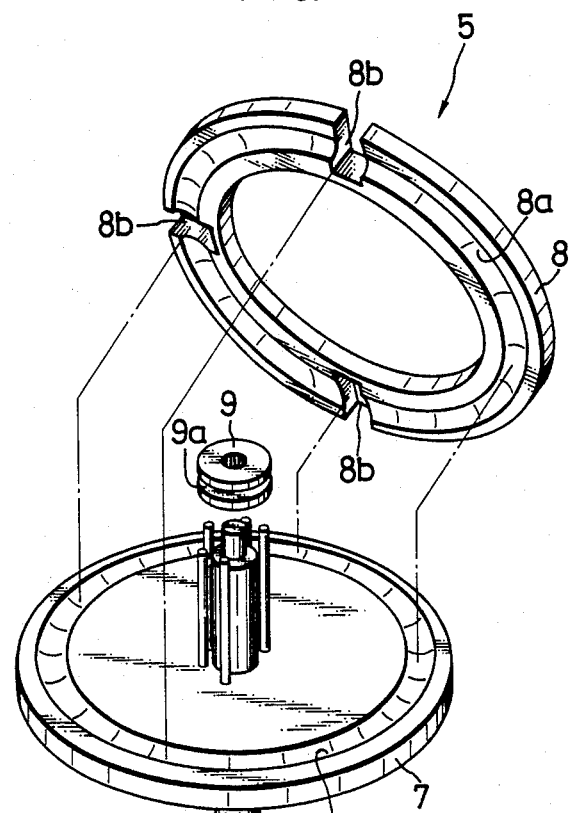
FIG. 26 is a disassembly perspective view showing an examples of the apparatus for producing the steering wheel core material.
Figure 27:
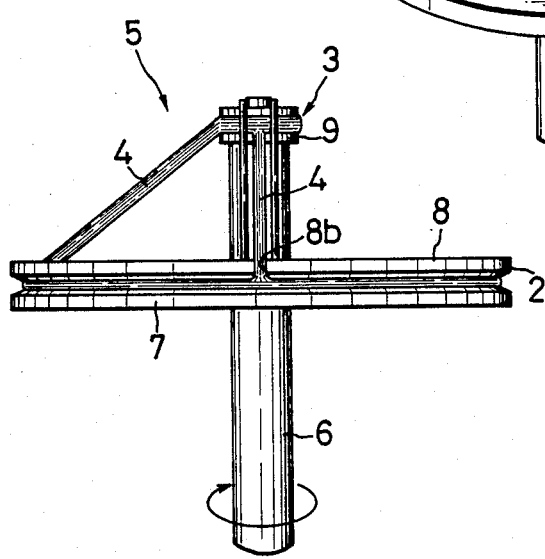
FIG. 27 is a front view showing the apparatus as shown in FIG. 26 which is in operation.

The thus produced steering wheel core material is processed into a steering wheel which has characteristics as shown in FIGS. 22 and 23. While the force applied to the steering wheel has a low torque, the elastic material 38 remains almost undeformed as shown in FIG. 22 and absorbs vibrations in the circumferential direction of the steering wheel. This leads to the improved flutter characteristics.

As the torque applied to the steering wheel increases, the elastic material 38 deforms and the projecting part 36b of the outer member 36 comes into contact with the recessed parts 35b of the inner member 35, so that the torque applied to the steering wheel is efficiently transmitted to the steering wheel (not shown).

FIG. 23 shows the relationship between the torque applied to the steering wheel and the torsional angle. While a low torque is applied to the steering wheel, it is transmitted to the steering shaft through the elastic material 38. As the result, the torsional angle increases more than the torque increases, and the torsional rigidity decreases, as indicated by the section I. This characteristic can be controlled by changing the gap between the inner member 35 and the outer member 36, or the density and pressure of the elastic material 38.

After the torque has reached a certain level, the elastic material 38 deforms, permitting the inner member 35 to come into contact with the outer member 36. In this state, the torque is transmitted from the steering wheel directly to the steering shaft. Thus the torsional angle increases less than the torque increases and the torsional rigidity increases.

In the seventh example as shown in FIG. 7, the boss metal fitting 40 is made up of an inner member 41 and an outer member 42, with the gap (in the radial direction) between them entirely filled with an elastic material 43. The projecting part 42b formed on the outer member 42 faces the recessed part 41b of the inner member 41. They have such dimensions that they come into contact with each other when the outer member turns. By joining the inner member 41 and the outer member 42 together through the elastic material 43, it is possible to improve the flutter characteristics.

What is claimed is:

1. A laminated FRP steering wheel core material formed by winding resin-impregnated continuous filaments in layer around the ring- and spoke-forming mold and the body of the boss metal fitting positioned at the center of the ring, characterized in that an elastic material is interposed between the body of the boss metal fitting and the resin-impregnated continuous filaments wound around the body of the boss metal fitting.

2. A steering wheel core material as claimed in claim 1, wherein the boss metal fitting has flat surfaces on the body thereof and an elastic material is interposed between the body and the resin-impregnated continuous filaments wound around the body.

3. A steering wheel core material as claimed in claim 1, wherein the boss metal fitting has grooves on the body thereof and an elastic material is interposed between the body and the resin-impregnated continuous filaments wound around the body.

4. A steering wheel core material as claimed in claim 1, wherein the boss metal fitting has pins on the body thereof and an elastic material is interposed between the body and the resin-impregnated continuous filaments wound around the body.

5. A steering wheel core material as claimed in claim 1, wherein the boss metal fitting is made up of an inner member connected to the steering shaft and an outer member around which the resin-impregnated continuous filaments are wound, said inner member having flat surfaces on the external periphery of the body thereof and said outer member having flat surfaces on the internal periphery of the body thereof, and the gap between said inner member and outer member is filled with an elastic material.

6. A steering wheel core material as claimed in claim 1, wherein the boss metal fitting is made up of an inner member connected to the steering shaft and an outer member around which the resin-impregnated continuous filaments are wound, either of said inner member or outer member having projecting parts and the other having recessed parts which loosely mate with said projecting parts, and the gap between said inner member and outer member is filled with an elastic material.

7. A steering wheel core material as claimed in any of claims 1 to 6, wherein the elastic material has a torsional rigidity of 30 to 300 N.m/rad.

8. A steering wheel core material as claimed in any of claims 1 to 6 wherein the elastic material is selected from the group of rubber, synthetic resin, air, and oil.

* * * * *